US010663664B2

(12) United States Patent
Nishioka et al.

(10) Patent No.: US 10,663,664 B2
(45) Date of Patent: May 26, 2020

(54) COATING REMOVAL TOOL

(71) Applicant: SUMITOMO ELECTRIC INDUSTRIES, LTD., Osaka-shi, Osaka (JP)

(72) Inventors: Daizo Nishioka, Yokohama (JP); Motoyoshi Kimura, Komaki (JP); Yusuke Takai, Komaki (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 16/325,851

(22) PCT Filed: Jul. 27, 2017

(86) PCT No.: PCT/JP2017/027289
§ 371 (c)(1),
(2) Date: Feb. 15, 2019

(87) PCT Pub. No.: WO2018/034124
PCT Pub. Date: Feb. 22, 2018

(65) Prior Publication Data
US 2019/0187377 A1 Jun. 20, 2019

(30) Foreign Application Priority Data
Aug. 19, 2016 (JP) .................... 2016-161127

(51) Int. Cl.
*G02B 6/245* (2006.01)
*G02B 6/44* (2006.01)
(Continued)

(52) U.S. Cl.
CPC ........... *G02B 6/245* (2013.01); *G02B 6/4497* (2013.01); *H02G 1/1212* (2013.01);
(Continued)

(58) Field of Classification Search
None
See application file for complete search history.

(56) References Cited

U.S. PATENT DOCUMENTS 9,819,161 B2 * 11/2017 Scirbona ............. H02G 1/1217
2014/0026717 A1  1/2014 Yamaguchi et al.
2014/0238208 A1  8/2014 Barnes et al.

FOREIGN PATENT DOCUMENTS

EP    2423719 A1    2/2012
JP    S60-033301 U  3/1985
(Continued)

OTHER PUBLICATIONS

Extended European Search Report dated Feb. 26, 2020 in European Patent Application No. 17841352.2.

*Primary Examiner* — Jerry Rahll
(74) *Attorney, Agent, or Firm* — Faegre Drinker Biddle & Reath LLP

(57) ABSTRACT

A coating removal tool includes a base part and a cover part, to remove a coating of an optical fiber by overlapping the cover part and the base part. The base part and the cover part are made of resin, and include at least a pair of coating removal blades including a base front blade portion provided on the base part and a cover front blade portion provided on the cover part. The base part includes a V-groove which sandwiches the optical fiber in either one or both of a front and rear of the optical fiber in the longitudinal direction and the cover part includes a V-groove which sandwiches the optical fiber and is provided on a side where the V-groove exists in the front and rear of the longitudinal direction in a state where the cover part and the base part are overlapped.

17 Claims, 10 Drawing Sheets

(51) Int. Cl.
*H02G 1/12* (2006.01)
*G02B 6/25* (2006.01)
*G02B 6/28* (2006.01)

(52) U.S. Cl.
CPC .............. *H02G 1/1256* (2013.01); *G02B 6/25* (2013.01); *G02B 6/2835* (2013.01)

(56) References Cited

FOREIGN PATENT DOCUMENTS

| | | |
|---|---|---|
| JP | H11-84138 A | 3/1999 |
| JP | 2000-193831 A | 7/2000 |
| JP | 2008-102441 A | 5/2008 |
| JP | 2014-182336 A | 9/2014 |
| JP | 2015-102616 A | 6/2015 |
| JP | 2016-80788 A | 5/2016 |
| WO | WO-2012/133568 A1 | 10/2012 |
| WO | WO-2015/031338 A1 | 3/2015 |

\* cited by examiner

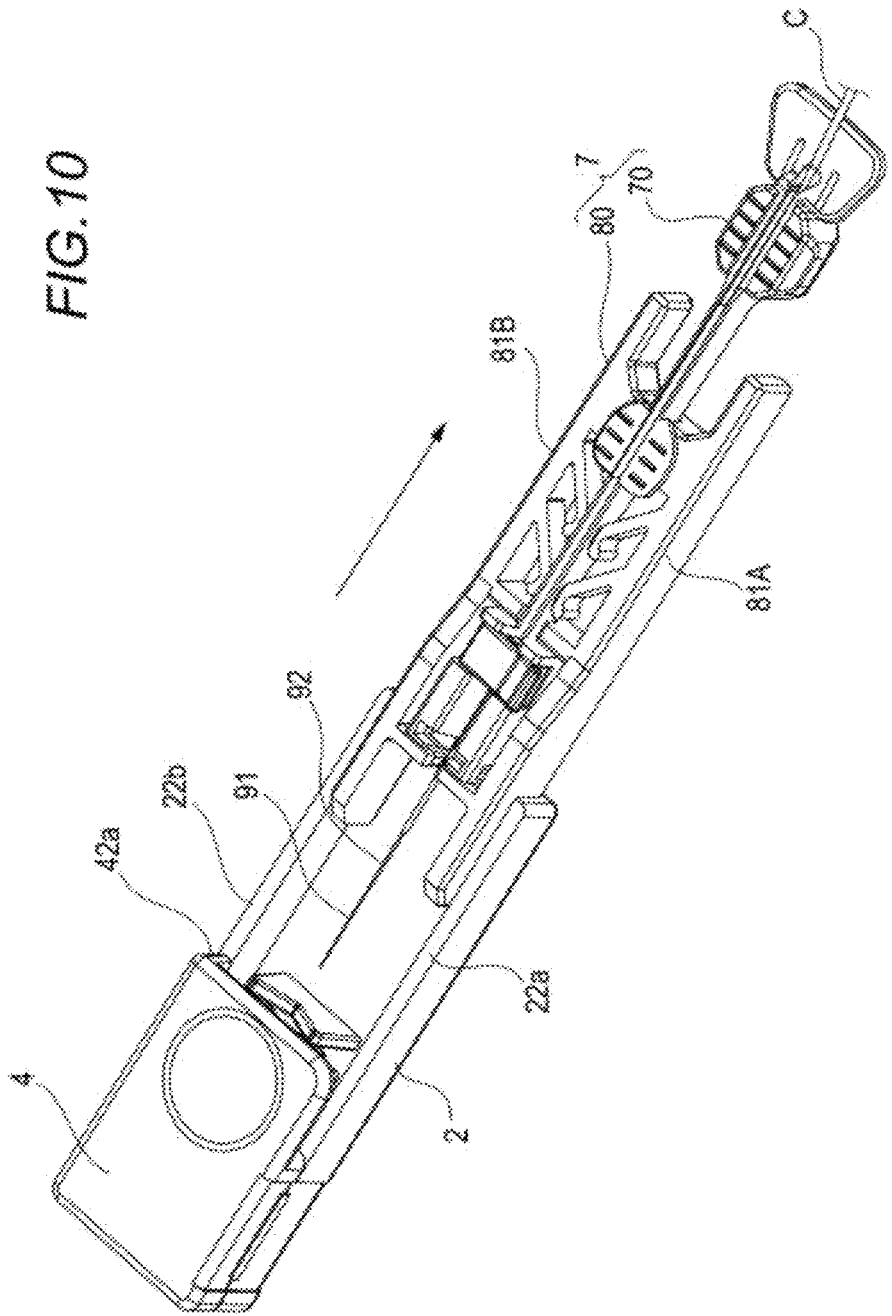

COATING REMOVAL TOOL

TECHNICAL FIELD

The present invention relates to a coating removal tool.

This application claims priority from Japanese Patent Application No. 2016-161127, filed on Aug. 19, 2016, the entire subject matter of which is incorporated herein by reference.

BACKGROUND ART

A coating removal tool which removes a coating of an optical fiber is known (see, e.g., Patent Literatures 1, 2).

CITATION LIST

Patent Literature

Patent Literature 1: JP-A-2016-80788
Patent Literature 2: WO2012/133568 pamphlet

SUMMARY OF INVENTION

A coating removal tool according to one aspect of the present disclosure includes a base part and a cover part, to remove a coating of an optical fiber by overlapping the cover part and the base part with each other via the optical fiber, in which a glass fiber is covered with the coating,
the base part and the cover part are made of resin, and include at least a pair of coating removal blades including a base blade portion provided on the base part and a cover blade portion provided on the cover part,
the base part includes a first V-groove which sandwiches the optical fiber in either one or both of a front and rear of the optical fiber in the longitudinal direction with respect to the base blade portion, and
the cover part includes a second V-groove which sandwiches the optical fiber, and the second V-groove is provided on a side where the first V-groove exists in the front and rear of the longitudinal direction with respect to the cover blade portion in a state where the cover part and the base part are overlapped with each other.

BRIEF DESCRIPTION OF DRAWINGS

FIG. 10 is a view illustrating the method of removing the coating of the optical fiber.

DESCRIPTION OF EMBODIMENTS

Figure 1:
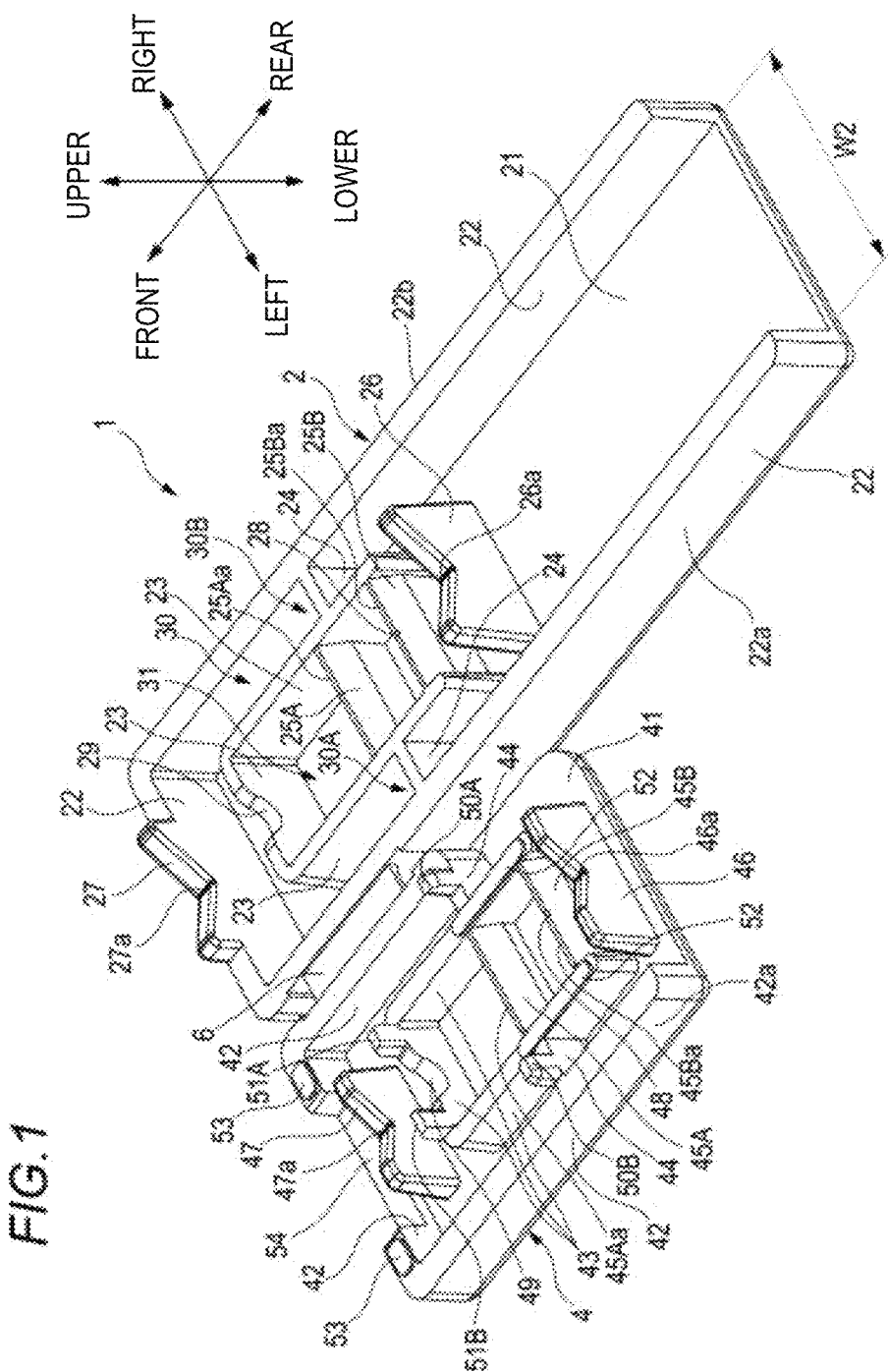
FIG. 1 is a perspective view of a coating removal tool according to the embodiment.

Problems to be Solved by the Present Disclosure

In a coating removal tool which removes a coating of the optical fiber in which a glass fiber is covered with a coating, if the position of the optical fiber with respect to the blade portion is deviated, there is a concern that the removal of the coating may be incomplete or the glass fiber may be damaged. For example, in the coating removal tool described in Patent Literature 1, a guide hole is provided at an end portion of a supporting column portion in front of the coating removal tool. A first sandwiching pair and a second sandwiching pair which function as coating removal blades are provided between an optical fiber holder and the above guide hole. It is configured that an end portion of the optical fiber is inserted through the above guide hole to hold the optical fiber linearly, and the coating is removed by the first sandwiching pair and the second sandwiching pair.

However, there is a concern that since the above guide hole is a hole having a diameter slightly larger than the diameter of the optical fiber, it is difficult to insert the optical fiber through the optical fiber hole, for example, the end portion of the optical fiber may be caught on the edge of the hole, so that the optical fiber cannot be linearly held, and the optical fiber may be disengaged from the first sandwiching pair and the second sandwiching pair, and the coating cannot be removed.

An object of the present disclosure is to provide an optical fiber coating removal tool in which positional deviation of an optical fiber with respect to a coating removal blade can be suppressed with a relatively simple structure.

Effects of the Present Disclosure

According to the present disclosure, the positional deviation of an optical fiber with respect to a coating removal blade can be suppressed with a relatively simple structure.

Description of Embodiment of the Present Invention

First, embodiments of the present invention will be listed and described.

A coating removal tool according to an embodiment of the present invention, (1) includes a base part and a cover part, to remove a coating of an optical fiber by overlapping the cover part and the base part with each other via the optical fiber, in which a glass fiber is covered with the coating,
the base part and the cover part are made of resin, and include at least a pair of coating removal blades including a base blade portion provided on the base part and a cover blade portion provided on the cover part,
the base part includes a first V-groove which sandwiches the optical fiber in either one or both of a front and rear of the optical fiber in the longitudinal direction with respect to the base blade portion, and
the cover part includes a second V-groove which sandwiches the optical fiber, and the second V-groove is provided on a side where the first V-groove exists in the front and rear of the longitudinal direction with respect to the cover blade portion in a state where the cover part and the base part are overlapped with each other.

With the first V-groove and the second V-groove of the above configuration, the optical fiber is sandwiched from above and below by the base part and the cover part at a relatively close position, and the coating of the optical fiber can be removed by the coating removal blade while maintaining the optical fiber in a linearly corrected state. Accordingly, it is possible to provide an optical fiber coating removal tool which can suppress the positional deviation of the optical fiber with respect to the coating removal blade with a relatively simple structure.

(2) The coating removal tool includes a hinge part which pivotably connects the cover part to the base part, it is preferable that the cover part, the base part and the hinge part are integrally formed.

Since the hinge part is provided, alignment when the cover part and the base part are overlapped is easy. Further, since the cover part and the base part are integrally connected via the hinge part, the entire coating removal tool can be manufactured by integral molding, and the manufacturing cost of the coating removal tool can be reduced.

(3) The coating removal tool includes a positioning portion which is positioned by engaging a protruding portion and a recessed part when the cover part and the base part are overlapped with each other, it is preferable that the protruding portion is provided on either one of the cover part and the base part, and the recessed part is provided on the other one.

Since the positioning portion which engages the protruding portion and the recessed part is provided, it is possible to improve an accuracy of alignment when the cover part and the base part are overlapped. Accordingly, the positions of the base blade portion and the cover blade portion can be more accurately aligned, and it is possible to remove the coating with high accuracy.

(4) It is preferable that a guide portion which regulates a movement direction of an optical fiber holding tool which holds the optical fiber is provided in either one or both of the base part and the cover part, and the guide portion is provided so as to extend in the longitudinal direction of the optical fiber.

When the optical fiber is held in the optical fiber holding tool to remove the coating, the guide portion regulates the movement direction when pulling the optical fiber holding tool, so that it is possible to prevent the optical fiber from being pulled in a bent state. Accordingly, it is possible to prevent the glass fiber from being damaged during coating removal.

(5) The coating removal tool includes interval regulating parts which regulate a cutting edge of the base blade portion and a cutting edge of the cover blade portion to a predetermined interval when the cover part and the base part are overlapped with each other, it is preferable that the interval regulating parts regulate to the predetermined interval by providing portions which are protruding in the direction of an interval between the cutting edge of the base blade portion and the cutting edge of the cover blade portion, in the vicinity of both sides in a direction orthogonal to the longitudinal direction of the optical fiber from the base blade portion and the cover blade portion.

When the cover part and the base part are overlapped, if the interval between the cutting edges is too wide, it is difficult to remove the coating of the optical fiber by peeling it off, and if the interval is too narrow, there is a risk of damaging the glass fiber, so it is desirable to be maintained at an appropriate predetermined interval. Therefore, by providing the interval regulating part provided with a portion, which is protruding in the interval direction between the cutting edge of the base blade portion and the cutting edge of the cover blade portion when the cover part and the base part are overlapped with each other, the interval between the cutting edge of the base blade portion and the cutting edge of the cover blade portion can be maintained at a predetermined interval.

(6) It is preferable that two pairs of the coating removal blades are provided at predetermined intervals in the front of and rear of the optical fiber in the longitudinal direction, and the two pairs of coating removal blades are blades for removing the coatings having different outer diameters in the optical fiber.

Since two pairs of blades for removing coatings of different outer diameters are provided, coatings of different outer diameters can be removed at one time. Accordingly, it is possible to reduce the number of working hours for removing the coating of the optical fiber. Further, since it is not necessary to prepare the coating removal tool for each different outer diameter of the coating, the cost of the tool can also be reduced.

(7) It is preferable that in the coating removal blades which remove the coating having a larger outer diameter in the two pairs of coating removal blades, arc-shaped recessed parts are formed in a part of a cutting edge of the base blade portion and in a part of a cutting edge of the cover blade portion respectively.

Since the coating removal blade for removing the coating having a larger outer diameter formed with an arc-shaped recessed part in a part of the cutting edge, it is easy to remove only the coating having a larger outer diameter while leaving the coating having a smaller outer diameter.

Details of Embodiment of the Invention

Specific examples of the coating removal tool according to the embodiment will be described below with reference to the drawings.

The present invention is not limited to these examples, but is indicated by the scope of the claims, and is intended to include all modifications within the meaning and scope equivalent to the claims.

Figure 2:
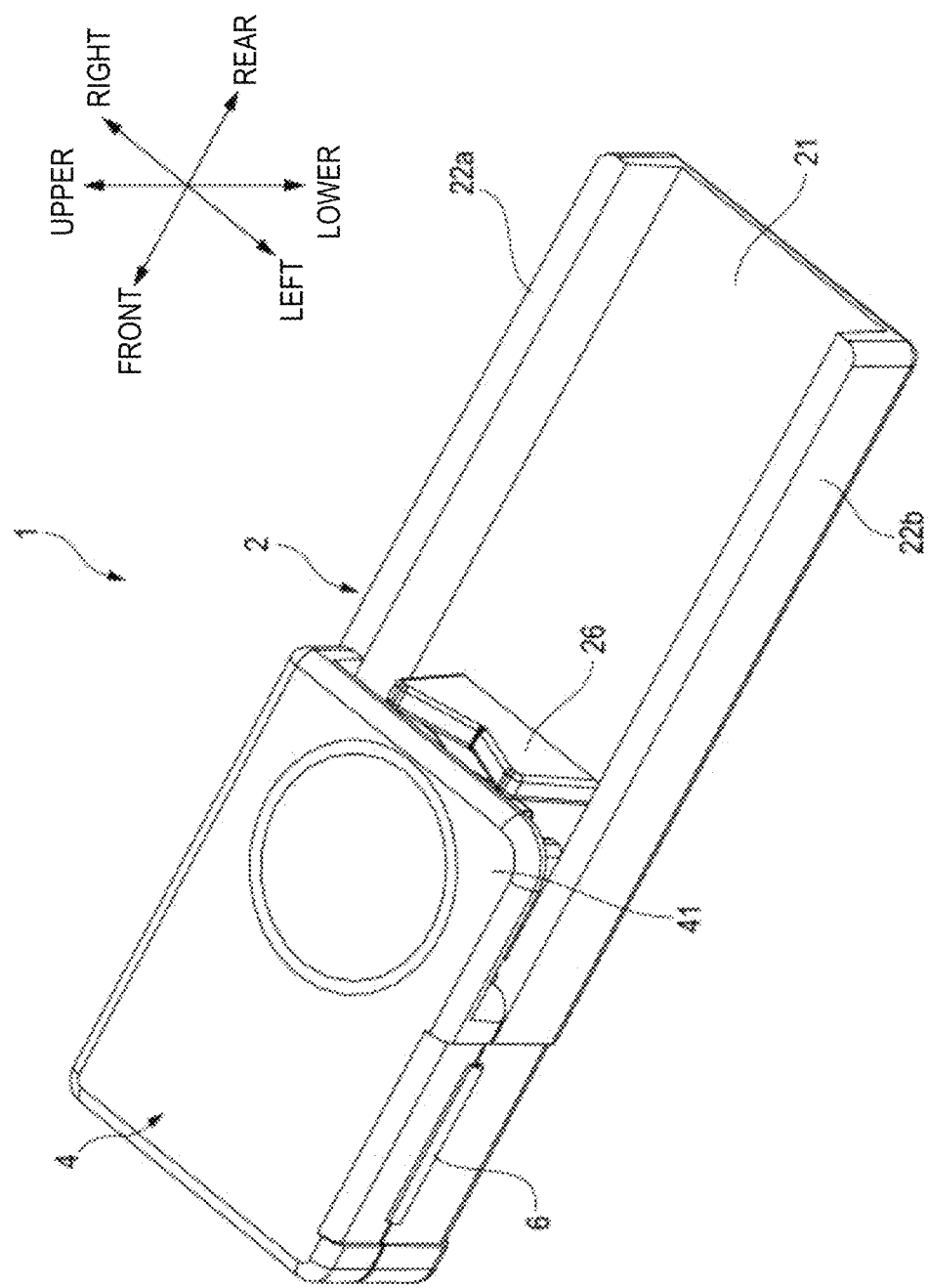
FIG. 2 is a perspective view showing a state where a cover part of the coating removal tool shown in FIG. 1 is overlapped with a base part.

As shown in FIGS. 1 and 2, the coating removal tool 1 includes a base part 2, and a cover part 4 overlapped on an upper side of the base part 2. The cover part 4 is pivotably connected to the base part 2 via the hinge part 6. The base part 2, the cover part 4, and the hinge part 6 are integrally formed of a resin (e.g., polyacetal (POM), polyamide (PA), etc.) which is excellent in strength, elastic modulus, and impact resistance as a material. In the following description, a front-rear direction, a left-right direction, and an upper-lower direction are directions indicated by arrows as appropriate in the drawings.

The base part 2 includes a rectangular base 21 elongated in the front-rear direction. Side walls 22 continuously extending to the left, the front, and the right edge portions are provided on an upper surface of the base 21. On the upper surface of the base 21, inner walls 23 extending parallel to each side wall 22 are provided inside the side walls 22.

As shown in FIG. 1, a regulating wall 24, which is extending in a direction (left-right direction) orthogonal to the longitudinal direction (front-rear direction) of each wall, is provided between the left side wall 22 and the inner wall 23 and between the right side wall 22 and the inner wall 23. A base front blade portion 25A (an example of a coating removal blade) and a base rear blade portion 25B (an example of a coating removal blade) extending in the left-right direction are provided between the left and right inner walls 23 at predetermined intervals in the front-rear direction.

The side walls 22, the inner walls 23, the regulating walls 24, the base front blade portion 25A, and the base rear blade portion 25B are provided so as to have the same height in the upper-lower direction in FIG. 1.

A portion surrounded by the side walls 22, the inner walls 23, and the regulating walls 24 serves as a recessed part 30 (an example of a positioning portion) with the upper surface of the base 21 as a bottom. A portion surrounded by the inner walls 23 and the base front blade portion 25A serves as a recessed part 31 (an example of a positioning portion) with the upper surface of the base 21 as a bottom. In the recessed part 30, a rear end portion of the recessed part 30 provided with the left regulating wall 24 is defined as a recessed part 30A in the following description, and a rear end portion of the recessed part 30 provided with the right regulating wall 24 is defined as a recessed part 30B in the following description.

A plate-shaped clamp part 26 protruding from the upper surface of the base 21 is provided behind the base rear blade portion 25B so as to be parallel to the base rear blade portion 25B. A clamp part 27 protruding upward from an upper end of the front side wall 22 is provided in front of the base front blade portion 25A so as to be parallel to the base front blade portion 25A. The clamp part may be provided both at the front and rear of the base blade portion (including the base front blade portion 25A and the base rear blade portion 25B) as in the present example, or may be provided on either one of the front and rear.

The above members of the base part 2 are formed integrally using a resin such as a POM, PA or the like as a material.

The base front blade portion 25A and the base rear blade portion 25B are base blades for removing the coating of the optical fiber, and are provided in the front-rear direction with an interval corresponding to the length of the coating to be removed. The base front blade portion 25A and the base rear blade portion 25B are formed such that the blade width becomes narrower toward the cutting edges (25Aa, 25Ba). The base front blade portion 25A is a parallel blade having a constant height (height in the upper-lower direction in FIG. 1) of the cutting edge 25Aa. The base rear blade portion 25B is a blade in which an arc-shaped recessed part 28 close to a semi-circular shape is formed in a part of the cutting edge 25Ba. The size (diameter) of the recessed part 28 is determined according to the outer diameter of the coating to be removed.

V-grooves 26a, 27a (an example of a first V-groove) for mounting optical fibers are formed on upper portions of the clamp parts 26, 27, respectively. The V-grooves 26a, 27a are formed at the same position in the left-right direction when viewed from the front-rear direction. A recessed part 29 for mounting an optical fiber is formed on an upper portion of the front inner wall 23. The recessed part 29 has a substantially semicircular shape, and is formed in a substantially central portion in the longitudinal direction (left-right direction) of the inner walls 23.

In the left and right side walls 22, portions 22a, 22b behind the regulating walls 24 have an interval matching a width of an optical fiber holding tool 7 described later in FIG. 5, and function as a guide portion which guides the optical fiber holding tool 7 along the side walls 22 in the front-rear direction.

The cover part 4 includes a rectangular base 41. In a state of FIG. 1, side walls 42, which is extending continuously to the left, the front, and the right edge portions, is provided on the upper surface of the base 41. On the upper surface of the base 41, inner walls 43 extending parallel to each side wall 42 are provided inside the side walls 42. A distance between the left and right side walls 42 is provided to be equal to a distance between the left and right side walls 22 of the base part 2. A distance between the left and right inner walls 43 is provided to be equal to a distance between the left and right inner walls 23 of the base part 2. The front inner wall 43 is formed behind the front inner wall 23 of the base part 2 only with a thickness of the inner wall 23.

walls 44, which are extending in a direction (left-right direction) orthogonal to the longitudinal direction (front-rear direction) respectively, are provided between the left side wall 42 and the inner wall 43 and between the right side wall 42 and the inner wall 43. The walls 44 are formed in the front of the regulating walls 24 of the base part 2 only with a thickness of the regulating walls 24. A cover front blade portion 45A (an example of a coating removal blade) and a cover rear blade portion 45B (an example of a coating removal blade) extending in the left-right direction are provided between the left and right inner walls 43 at predetermined intervals in the front-rear direction. The interval between the cover front blade portion 45A and the cover rear blade portion 45B is the same as the interval between the base front blade portion 25A and the base rear blade portion 25B of the base part 2. A distance from the front side wall 42 to the cover front blade portion 45A is the same as a distance from the front side wall 22 of the base part 2 to the base front blade portion 25A.

The side walls 42, the inner walls 43, the walls 44, the cover front blade portion 45A, and the cover rear blade portion 45B are provided at the same height.

An upper end of the right wall 44 is provided with a protruding portion 50A (an example of a positioning portion) protruding upward, and an upper end of the left wall 44 is provided with a protruding portion 50B (an example of a positioning portion) protruding upward. The protruding portions 50A and 50B are provided at intervals which can be housed in the recessed parts 30A and 30B of the base part 2 respectively.

Protruding portions 51A, 51B (an example of a positioning portion) protruding upward are provided at an upper end of the front inner wall 43. The protruding portion 51A, 51B are provided at intervals which can be housed in the recessed part 31 of the base part 2, i.e., at least inside the left and right inner walls 43.

In the present embodiment, the base part 2 is provided with recessed parts, and the cover part 4 is provided with protruding portions, but it may be configured that the base part 2 is provided with protruding portions and the cover part 4 is provided with recessed parts.

A plate-shaped clamp part 46 protruding from the upper surface of the base 41 is provided behind the cover rear blade portion 45B so as to be parallel to the cover rear blade portion 45B. A plate-shaped clamp part 47 protruding from the upper surface of the base 41 is provided between the front side wall 42 and the front inner walls 43 in front of the cover front blade portion 45A so as to be parallel to the cover front blade portion 45A. The clamp part 46 of the cover part 4 is provided slightly forward from the clamp part 26 of the base part 2. The clamp part 47 of the cover part 4 is provided slightly behind from the clamp part 27 of the base part 2. Therefore, when the cover part 4 is overlapped with the base part 2, the clamp part 46 and the clamp part 26 are arranged back and forth in parallel with each other with a relatively short distance between the clamp parts. Similarly, the clamp part 27 and the clamp part 47 are arranged back and forth in parallel with each other with a relatively short distance therebetween.

When the clamp parts of the base part 2 are provided on both front and rear sides of the base blade portions (25A, 25B) as in the present example, the clamp parts of the cover part 4 are provided both in the front and rear of the cover blade portions (45A, 45B). In contrast, when the clamp part of the base part 2 is provided at either the front or rear of the base blade portions (25A, 25B), it is provided on a same side on which the clamp part is provided. That is, when the rear clamp part 26 is provided with respect to the base blade portions (25A, 25B) of the base part 2, the cover part 4 is provided with the clamp part 46 which is rearward with respect to the cover blade portions (45A, 45B). When the front clamp part 27 is provided on the base part 2, the front clamp part 47 is provided in the cover part 4.

First interval regulating parts 52 protruding upward are provided at upper ends of the left and right inner walls 43. The first interval regulating parts 52 are provided at least from a position where the cover front blade portion 45A is provided to a position where the cover rear blade portion 45B is provided. The first interval regulating parts 52 have a function as, for example, a spacer which regulates the interval between the cutting edge 25Aa of the base front blade portion 25A and a cutting edge 45Aa of the cover front blade portion 45A and the interval between the cutting edge 25Ba of the base rear blade portion 25B and the cutting edge 45Ba of the cover rear blade portion 45B to a predetermined interval in a state (state in FIG. 2) where the cover part 4 and the base part 2 are overlapped. The thickness of the first interval regulating parts 52 are set according to a diameter of the glass fiber in the optical fiber from which the coating is removed. The thickness of the first interval regulating parts 52 are set such that at least the interval between the cutting edge 25Aa of the base front blade portion 25A and the cutting edge 45Aa of the cover front blade portion 45A is, for example, 0.05 to 0.11 mm.

second interval regulating parts 53 protruding upward are provided at an upper end of the front side wall 42. The second interval regulating parts 53 fill a gap which can occur between the side walls 22 of the base part 2 and the side walls 42 of the cover part 4 when the cover part 4 is overlapped on the base part 2, and have a function of regulating the interval between the base blade portions (25A, 25B) and the cover blade portions (45A, 45B) and regulating the upper-lower interval of the clamp part 47 with respect to the clamp part 27.

The above members of the cover part 4 are made of resin such as a POM and PA as a material, and are integrally formed.

The cover front blade portion 45A and the cover rear blade portion 45B are cover blades for removing the coating of the optical fiber, and when the cover part 4 is overlapped with the base part 2, the cover front blade portion 45A faces the base front blade portion 25A and the cover rear blade portion 45B faces the base rear blade portion 25B. The base front blade portion 25A and the cover front blade portion 45A configure one pair of coating removal blades, and the base rear blade portion 25B and the cover rear blade portion 45B configure the other pair of coating removal blades. The cover front blade portion 45A has the same configuration as the base front blade portion 25A, and the cover rear blade portion 45B has the same configuration as the base rear blade portion 25B. The cover rear blade portion 45B is provided with a recessed part 48 corresponding to the recessed part 28 of the base rear blade portion 25B.

V-grooves 46a, 47a (an example of a second V-groove) which sandwich the optical fiber are formed on upper portions of the clamp parts 46, 47 respectively. The V-grooves 46a, 47a are formed at the same position in the left-right direction when viewed from the front-rear direction. The V-grooves 46a, 47a are formed at the same position in the left-right direction although an upper-lower direction are opposite to the V-grooves 26a, 27a of the base part 2, when the cover part 4 is overlapped on the base part 2.

A recessed part 49 which holds the optical fiber is formed on an upper portion of the front inner wall 43. The recessed part 49 has a substantially semicircular shape, and is formed in a substantially central portion of the front inner wall 43 in the longitudinal direction (left-right direction).

A recessed part 54 which houses the clamp part 27 of the base part 2 is formed in the front side wall 42.

In the left side wall 42, the rear portion 42a of the wall 44 has an interval matching the width of the optical fiber holding tool 7 described later in FIG. 5, and functions as a guide portion which guides the optical fiber holding tool 7 along the wall 44 in the front-rear direction.

Figure 3:
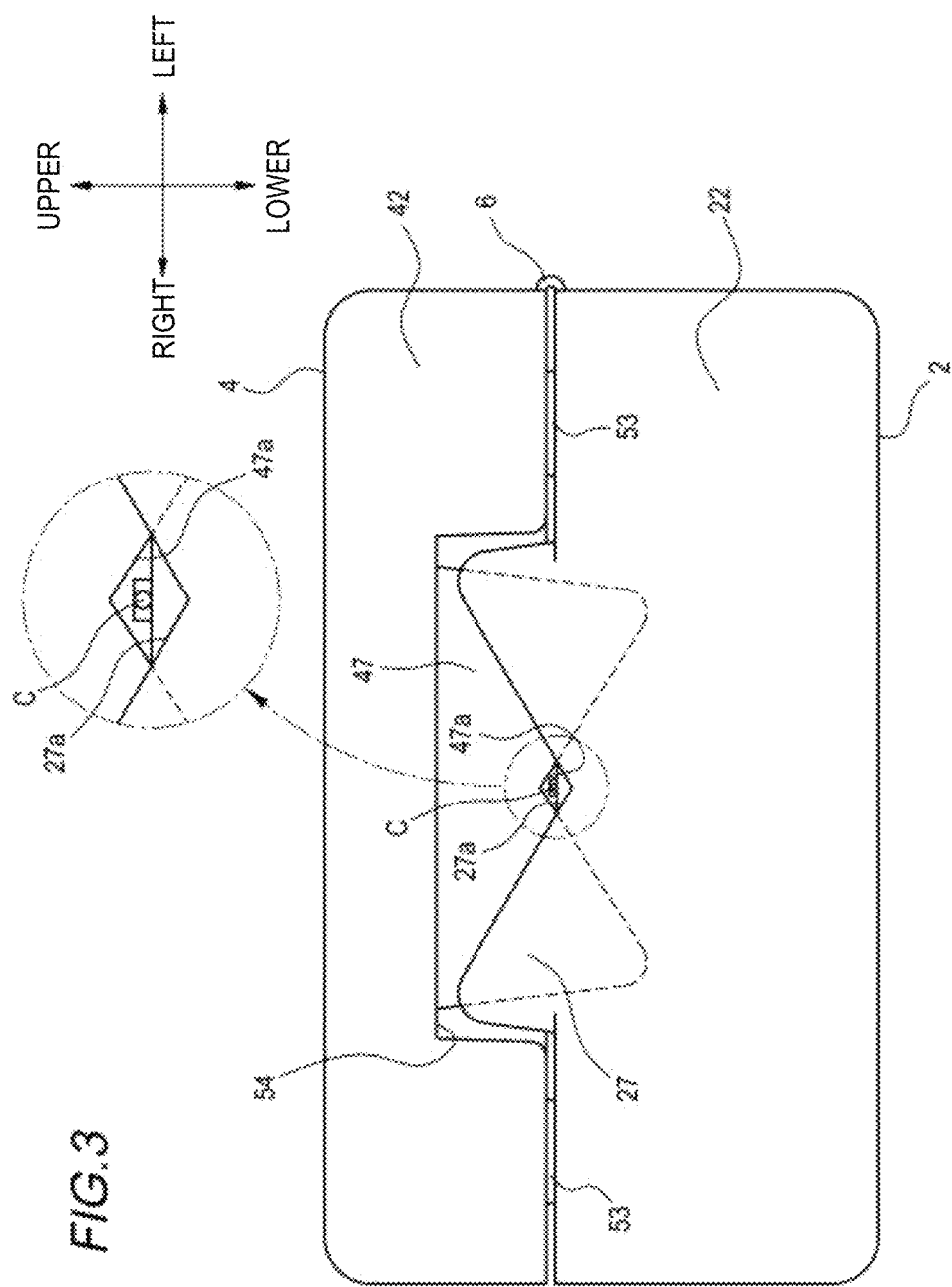
FIG. 3 is a view of the coating removal tool shown in FIG. 2 as viewed from front.

As shown in FIG. 3, when the cover part 4 is overlapped with the base part 2 and viewed from a front side, the side wall 42 of the cover part 4 overlaps the side wall 22 of the base part 2, the clamp part 27 of the base part 2 is housed in the recessed part 54 of the cover part 4, and the clamp part 47 of the cover part 4 is arranged behind the clamp part 27. A V-groove 27a of the clamp part 27 is recessed downward, and the V-groove 47a of the clamp part 47 is recessed upward. The optical fiber C is arranged in the interval between both V-grooves. At this time, even if the optical fiber C is arranged so as to be slightly deviated from a center position in the left-right direction, in accordance with the overlapping of the cover part 4 and the base part 2, the optical fiber C moves toward a center in the left-right direction along inclined surfaces of the V-groove 27a and the V-groove 47a, and is arranged at a preferable position.

Figure 4:
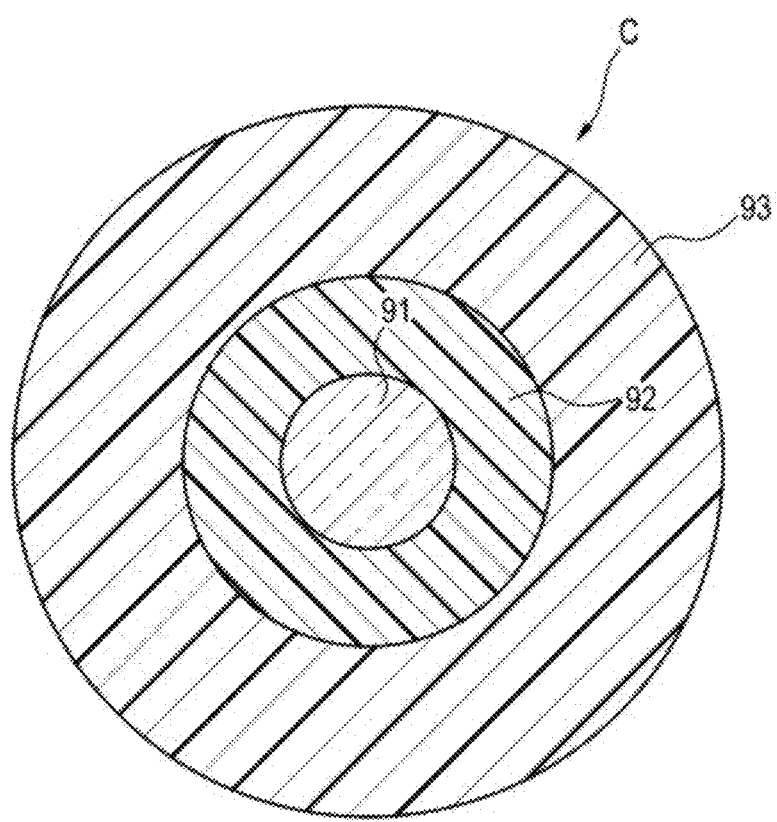
FIG. 4 is a cross-sectional view of the optical fiber.

As shown in FIG. 4, the optical fiber C includes a glass fiber 91 configured by a core and a clad, a first coating portion 92 which covers the glass fiber 91, and a second coating portion 93 which covers the first coating portion 92. The glass fiber 91 is formed of, for example, quartz glass, and the first coating portion 92 and the second coating portion 93 are formed of, for example, an ultraviolet curing resin.

Figure 5:
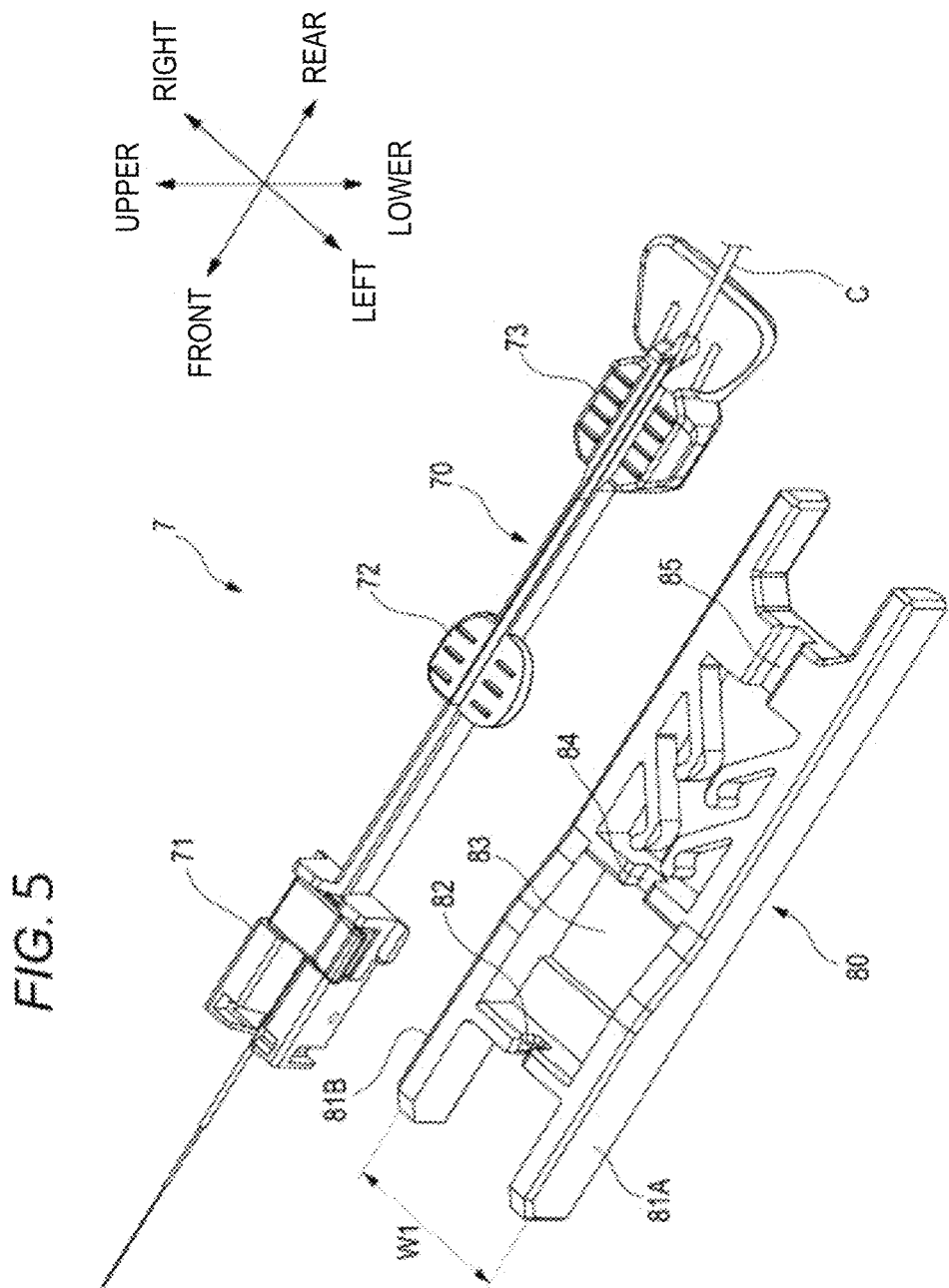
FIG. 5 is a perspective view of an optical fiber holding tool.

As shown in FIG. 5, the optical fiber holding tool 7 includes an optical fiber holder 70 and a cut spacer 80.

The optical fiber holder 70 includes fixing portions 71 to 73 for fixing the optical fiber C thereto. The optical fiber C is fixed to a central portion of the fixing portions 71 to 73 in the left-right direction in a state of being extended in the front-rear direction. In FIG. 5, the first coating portion 92 and the second coating portion 93 of the optical fiber C are removed. The cut spacer 80 includes a pair of slide portions 81A, 81B extending in the front-rear direction. Recessed parts 82 to 85 for fixing the optical fiber holder 70 are provided between the slide portions 81A, 81B so as to be continuous in the front-rear direction. An interval W1 between the slide portions 81A, 81B is formed to be slightly narrower than an interval W2 (see FIG. 1) between the left and right side walls 22 (guide portions 22a, 22b) in the base part 2 of the coating removal tool 1.

Next, a method of removing the coating of the optical fiber C by using the coating removal tool 1 will be described with reference to FIGS. 6 to 10.

Firstly, the optical fiber holding tool 7 is prepared such that the coating of the optical fiber C to be removed is fixed to the optical fiber holder 70 and the optical fiber holder 70 is fixed to the cut spacer 80. In this example, the coating of the optical fiber C configured by an outer diameter of the glass fiber 91, for example, 0.125 mm, an outer diameter of the first coating portion 92, for example, 0.25 mm, and an outer diameter of the second coating portion 93, for example, 0.5 mm, is removed.

The interval between the cutting edge 25Aa and the cutting edge 45Aa and the interval between the cutting edge 25Ba and a cutting edge 45Ba in a state where the cover part 4 and the base part 2 are overlapped (the state in FIGS. 7 and 10) is set to, for example, 0.075 mm. A radius of the recessed part 28 of the base rear blade portion 25B and a radius of the recessed part 48 of the cover rear blade portion 45B are set to be slightly larger than a radius of a second coating portion 93, for example, 0.14 mm.

Figure 6:
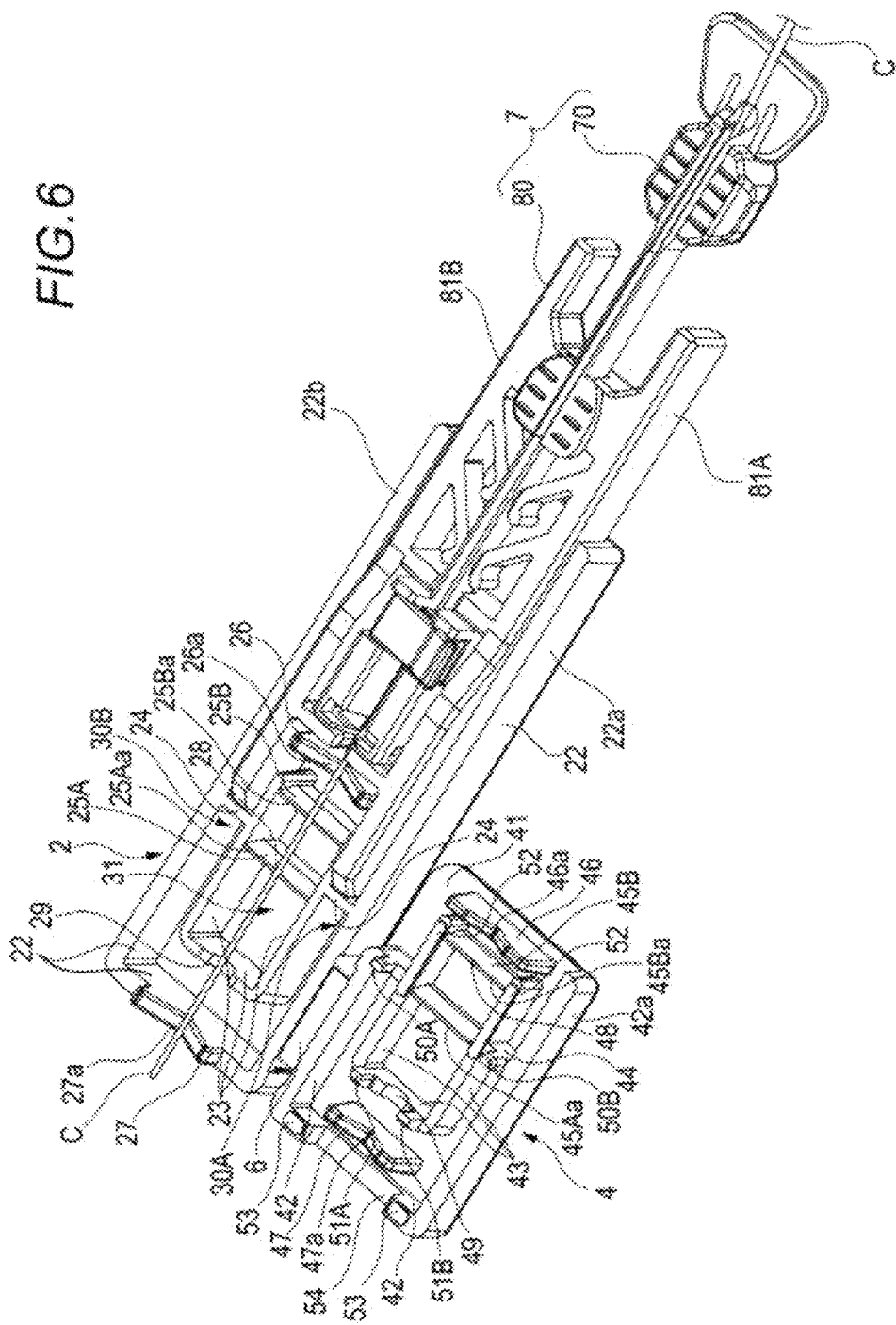
FIG. 6 is a view illustrating a method of removing a coating of the optical fiber.

As shown in FIG. 6, the optical fiber holding tool 7 is set on the base part 2 of the coating removal tool 1. At this time, the optical fiber holding tool 7 moves forward along the guide portions 22a, 22b of the base part 2 until the front end surfaces of the slide portions 81A, 81B abut against the regulating walls 24 of the base part 2 respectively. A Tip portion of the optical fiber C is linearly mounted on the V-groove 26a, on the recessed part 28 of the base rear blade portion 25B, on the base front blade portion 25A, on the recessed part 29, and on the V-groove 27a. In this example, the optical fiber C is fixed with a length such that a tip of the optical fiber C mounted on the V-groove 27a, but a position of the optical fiber C is moved in the front-rear direction and fixed to the optical fiber holding tool 7 according to a length of the coating to be removed.

Figure 7:
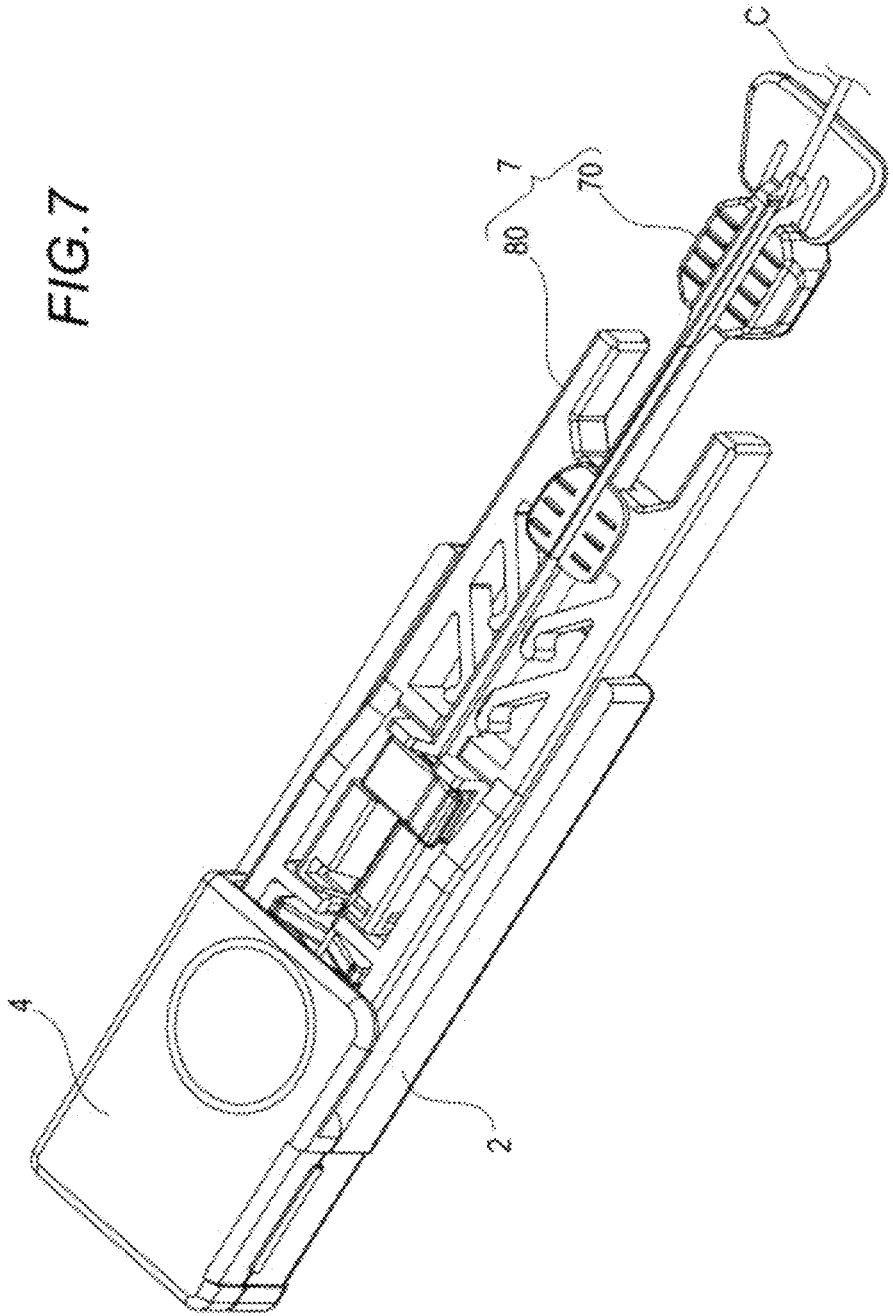
FIG. 7 is a view illustrating the method of removing the coating of the optical fiber.

Subsequently, the cover part 4 is pivoted via the hinge part 6, and the cover part 4 is overlapped on the base part 2 as shown in FIG. 7. At this time, the protruding portion 50A of the cover part 4 engages with the recessed part 30A of the base part 2, and the protruding portion 50B engages with the recessed part 30B, whereby a position of the cover part 4 with respect to the base part 2 is determined. The protruding portions 51A, 51B of the cover part 4 are engaged with the recessed part 31 of the base part 2 to be similarly positioned.

The side walls 42 of the cover part 4 overlaps the side walls 22 of the base part 2, and the left and right inner walls 43 of the cover part 4 overlap the left and right inner walls 23 of the base part 2.

The clamp part 46 of the cover part 4 is arranged between the base rear blade portion 25B and the clamp part 26 in an upper-lower direction opposite to a direction of the clamp part 26. Accordingly, the optical fiber C is sandwiched between an upward V-groove 26a of the clamp part 26 and a downward V-groove 46a of the clamp part 46.

The clamp part 47 of the cover part 4 is arranged between the front inner wall 23 and the clamp part 27 of the base part 2 in an upper-lower direction opposite to a direction of the clamp part 27. Accordingly, the optical fiber C is sandwiched between an upward V-groove 27a of the clamp part 27 and a downward V-groove 47a of the clamp part 47.

The front inner wall 43 of the cover part 4 is arranged behind the front inner wall 23 of the base part 2. Accordingly, the optical fiber C is held by an upward recessed part 29 of the inner walls 23 and a downward recessed part 49 of the inner walls 43.

The base front blade portion 25A and the cover front blade portion 45A cut from the upper-lower direction in the coating of the optical fiber C. Similarly, the base rear blade portion 25B and the cover rear blade portion 45B cut from the upper-lower direction in the coating of the optical fiber C.

Figure 8:
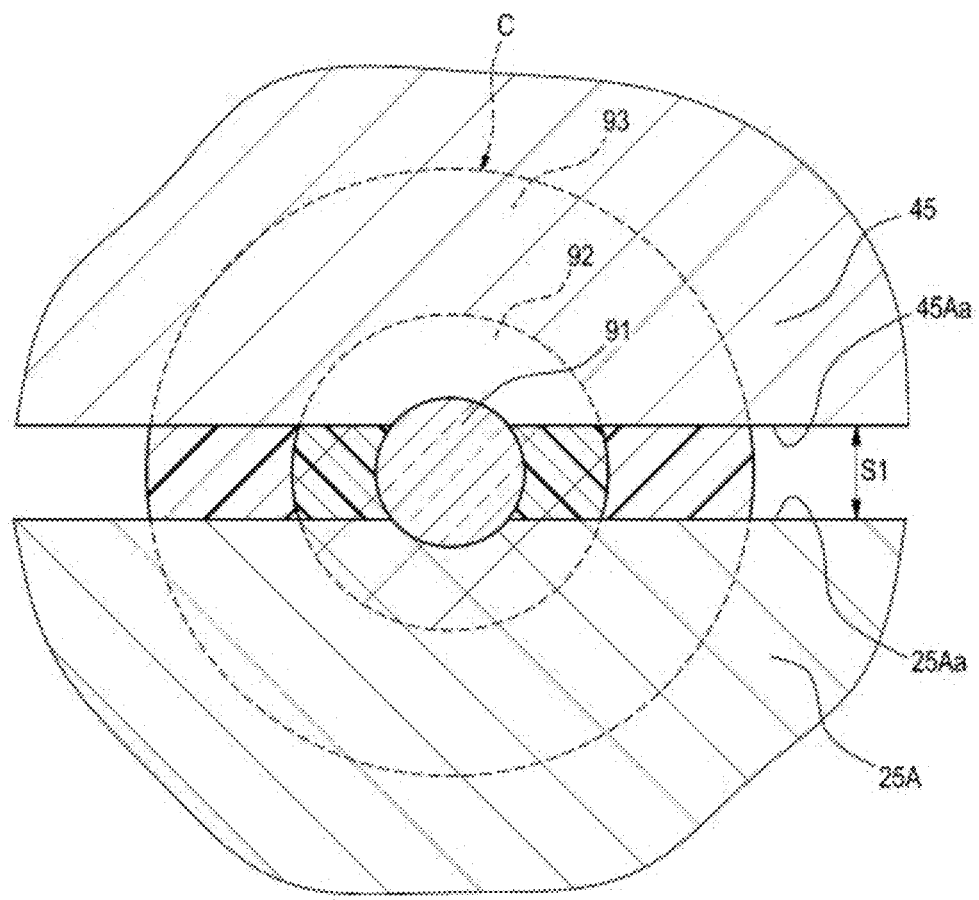
FIG. 8 is a view illustrating the method of removing the coating of the optical fiber.

The base front blade portion 25A and the cover front blade portion 45A are formed of a resin of a material harder than the first coating portion 92 and the second coating portion 93 formed of the ultraviolet curing resin or the like. Therefore, as shown in FIG. 8, in the first coating portion 92 and the second coating portion 93 of the optical fiber C, notches are made with an interval S1 (e.g., 0.075 mm) between the cutting edge 25Aa of the base front blade portion 25A and the cutting edge 45Aa of the cover front blade portion 45A. On the other hand, since the glass fiber 91 (quartz glass) is a material harder than the resin, portions of the base front blade portion 25A and the cover front blade portion where the glass fiber 91 abuts on the base front blade portion 25A and the cover front blade portion 45A are recessed along a shape of the glass fiber 91. Therefore, notches of the base front blade portion 25A and the cover front blade portion 45A are not made into the glass fiber 91.

Figure 9:
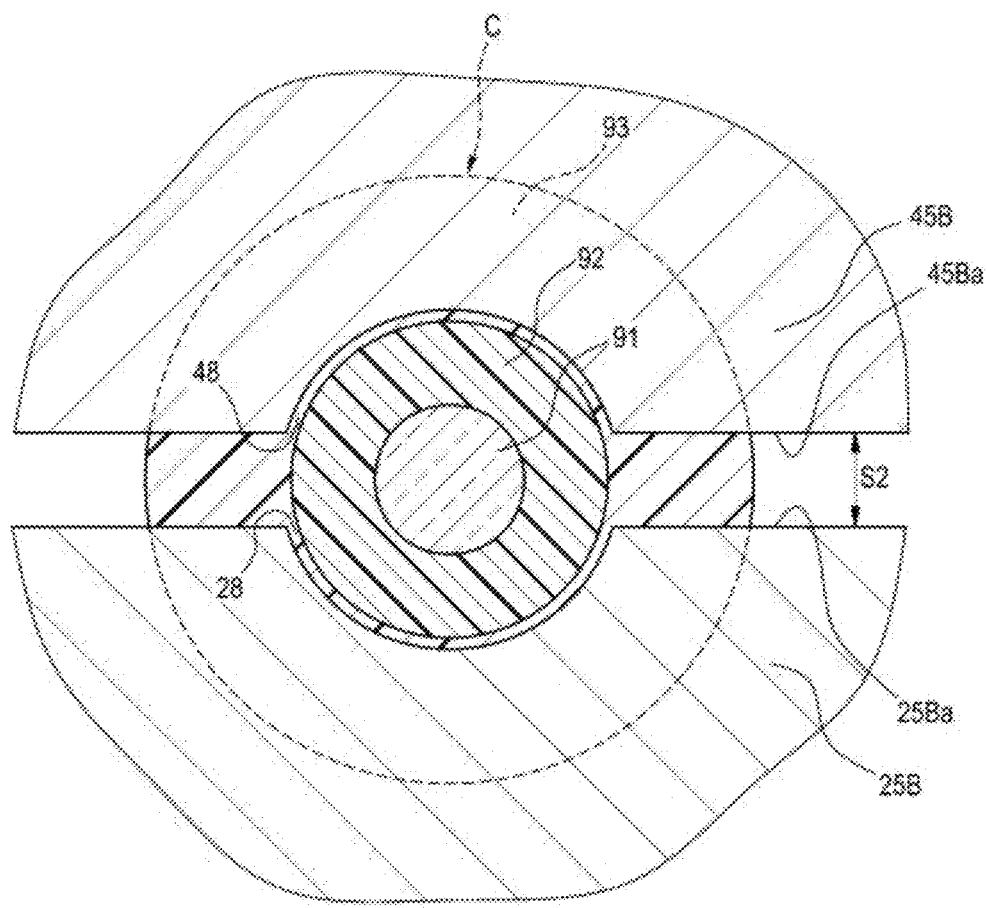
FIG. 9 is a view illustrating the method of removing the coating of the optical fiber.

At places where the optical fiber C is in contact with the base rear blade portion 25B and the cover rear blade portion 45B, as shown in FIG. 9, in the second coating portion 93 of the optical fiber C, notches are made to an interval S2 (e.g., 0.075 mm) between the cutting edge 25Ba and the cutting edge 45Ba. At this time, since the recessed part 28 and the recessed part 48 having a diameter slightly larger than the first coating portion 92 are formed respectively in the base rear blade portion 25B and the cover rear blade portion 45B, no notch is made in the first coating portion 92 entering the recessed parts 28, 48.

As shown in FIG. 10, the optical fiber holding tool 7 is pulled rearward along the guide portions 22a, 22b, 42a. Accordingly, the first coating portion 92 and the second coating portion 93 are split by the base front blade portion 25A and the cover front blade portion 45A starting from the places where the notches are made, and the first coating portion 92 and the second coating portion 93 in front of the base front blade portion 25A and the cover front blade portion 45A are removed from the optical fiber C. At the same time, the second coating portion 93 is split by the base rear blade portion 25B and the cover rear blade portion 45B starting from the places where the notches are made, and the second coating portion 93 in front of the base rear blade portion 25B and the cover rear blade portion 45B is removed from the optical fiber C.

According to the coating removal tool 1 configured as described above, the base part 2 includes the V-groove 27a which sandwiches the optical fiber C on the front side of the optical fiber C in the longitudinal direction with respect to the base blade portions (25A, 25B), and includes a V-groove 26a on the rear side. Similarly to the base part 2, the cover part 4 includes a V-groove 47a on the front side in the longitudinal direction with respect to the cover blade portions (45A, 45B), and includes a V-groove 46a on the rear side. When the base part 2 includes a V-groove on either the front or the rear in the longitudinal direction with respect to the base blade portion (25A, 25B) (for example, including the rear V-groove 26a), the cover part 4 also includes a V-groove (rear V-groove 46a) on the same side as the base part 2. Therefore, the optical fiber C can be reliably sandwiched from above and below by two V-grooves, for example, the V-groove 26a of the base part 2 and the V-groove 46a of the cover part 4, or the V-groove 27a and the V-groove 47a, with a relatively close distance in the front-rear direction. Therefore, the coating of the optical fiber C can be removed by the coating removal blade while holding the optical fiber C set between the base part 2 and the cover part 4 in a linearly corrected state. Accordingly, it is possible to suppress the positional deviation of the optical fiber with respect to the coating removal blade with a relatively simple structure.

Further, the protruding portions 50A, 50B are engaged with the recessed parts 30A, 30B, and the protruding portions 51A, 51B are engaged with the recessed part 31 to provide a positioning portion capable of accurately positioning the cover part 4 with respect to the base part 2. Accordingly, the positions of the base blade portions (25A, 25B) facing the cover blade portions (45A, 45B) can be more accurately aligned, and the coating of the optical fiber C can be removed with high accuracy.

Incidentally, when the base part 2 and the cover part 4 are overlapped, if the interval between the cutting edges is too wide, it is difficult to peel and remove the coating of the optical fiber C, and if the interval is too narrow, there is a possibility of damaging the glass fiber 91, so it is desirable to be maintain at an appropriate predetermined interval. In contrast, the interval between the cutting edges (25Aa, 25Ba) of the base blade portions (25A, 25B) and the cutting edges (45Aa, 45Ba) of the cover blade portions (45A, 45B) can be maintained at a predetermined interval by providing the interval regulating parts 52, 53 in the coating removal tool 1. Further, by integrally forming the base blade portions (25A, 25B) and the cover blade portions (45A, 45B) as a part of the base part 2 and a part of the cover part 4 with a resin material, a blade portion to which the glass fiber 91 abuts can be recessed. Therefore, by adjusting the interval between the cutting edges to 0.05 to 0.11 mm by the interval regulating parts 52, 53, it is possible to reliably remove the first coating portion 92 and the second coating portion 93 of the optical fiber C, and to suppress an influence on the glass fiber 91 due to a contact of the blade portion of the resin. Further, by ensuring the interval between the cutting edges to 0.05 to 0.11 mm, it is possible to suppress a load on the blade portion which is recessed each time the glass fiber 91 is abutted, and to maintain sufficient durability.

Further, since the hinge part 6 is provided, it is easy to align the cover part 4 and the base part 2 when they are overlapped. Further, since the cover part 4 and the base part 2 are integrally connected via the hinge part 6, the entire coating removal tool 1 can be manufactured by integral molding, and manufacturing cost of the coating removal tool 1 can be reduced.

Further, when the optical fiber C is held by the optical fiber holding tool 7 to remove the coating, the guide portions 22a, 22b, 42a regulates the movement direction when pulling the optical fiber holding tool 7, so that the optical fiber C can be prevented from being pulled in a bent state. Accordingly, it is possible to suppress damage to the glass fiber 91 applied during coating removal, and to improve product efficiency. The guide portion is not limited to the structure as described above, as long as the optical fiber holding tool 7 is movable relative to the base part and the cover part along the longitudinal direction of the optical fiber. It may be provided at a location other than an end of the base of the base part or the base of the cover part.

Since the pair of coating removal blades which removes the first coating portion 92 having a small outer diameter and the pair of coating removal blades which removes the second coating portion 93 having a large outer diameter are provided, the first coating portion 92 and the second coating portion 93 can be removed at one time. Accordingly, it is possible to reduce the number of working hours for removing the coating of the optical fiber. Further, since it is not necessary to prepare the coating removal tool for each outer diameter of the coating, the cost of the tool can also be reduced. Further, since the coating removal blade which removes the second coating portion 93 having a larger outer diameter is formed with arc-shaped recessed parts 28, 48 in a part of the cutting edge, it is easy to remove only the second coating portion 93 having a larger outer diameter while leaving the first coating portion 92 having a smaller outer diameter.

Although the present invention is described in detail with reference to a particular embodiment, it is apparent to those skilled in the art that various changes and modifications can be made without departing from the spirit and scope of the present invention. The numbers, positions, shapes, and the like of components described above are not limited to the above embodiment, and can be changed to suitable numbers, positions, shapes, and the like during carrying out the present invention.

REFERENCE SIGNS LIST

1 Coating removal tool
2 Base part
4 Cover part
9 Hinge part
7 Optical fiber holding tool
21, 41 Base
22, 42 Side wall
22a, 22b, 42a Guide portion
23, 43 Inner wall
24 Regulating wall
25A Base front blade portion (an example of a coating removal blade)
25Aa Cutting edge
25B Base rear blade portion (an example of a coating removal blade)
25Ba Cutting edge
26, 27 Clamp part
26a, 27a V-groove (an example of a first V-groove)
28, 48 Recessed part
30 (30A, 30B), 31 Recessed part (an example of a positioning portion)
45A Cover front blade portion (an example of a coating removal blade)
45Aa Cutting edge
45B Cover rear blade portion (an example of a coating removal blade)
45Ba Cutting edge
50A, 50B, 51A, 51B Protruding portion (an example of a positioning portion)
46, 47 Clamp part
46a, 47a V-groove (an example of a second V-groove)
52 First interval regulating part
53 Second interval regulating part
70 Optical fiber holder
71~73 Fixing portions
80 Cut spacer
81A, 81B Slide portion
82~85 Recessed part
S1, S2, W1, W2 Interval

The invention claimed is:

1. A coating removal tool comprising a base part and a cover part, to remove a coating of an optical fiber by overlapping the cover part and the base part with each other via the optical fiber, in which a glass fiber is covered with the coating, wherein the base part and the cover part are made of resin, and include at least a pair of coating removal blades including a base blade portion provided on the base part and a cover blade portion provided on the cover part, wherein the base part includes a first V-groove which sandwiches the optical fiber in either one or both of a front and rear of the optical fiber in the longitudinal direction with respect to the base blade portion, and wherein the cover part includes a second V-groove which sandwiches the optical fiber, and the second V-groove is provided on a side where the first V-groove exists in the front and rear of the longitudinal direction with respect to the cover blade portion in a state where the cover part and the base part are overlapped with each other, wherein a positioning portion positioned by engaging a protruding portion and a recessed part when the cover part and the base part are overlapped with each other, and wherein the protruding portion is provided on either one of the cover part and the base part, and the recessed part is provided on the other one.

2. The coating removal tool according to claim 1, comprising a hinge part that pivotably connects the cover part to the base part,
wherein the cover part, the base part and the hinge part are integrally formed.

3. The coating removal tool according to claim 1,
wherein a guide portion which regulates a movement direction of an optical fiber holding tool which holds the optical fiber is provided in either one or both of the base part and the cover part, and
wherein the guide portion is provided so as to extend in the longitudinal direction of the optical fiber.

4. The coating removal tool according to claim 1, comprising interval regulating parts that regulate a cutting edge of the base blade portion and a cutting edge of the cover blade portion to a predetermined interval when the cover part and the base part are overlapped with each other,
wherein the interval regulating parts regulate to the predetermined interval by providing portions which are protruding in the direction of an interval between the cutting edge of the base blade portion and the cutting edge of the cover blade portion, in the vicinity of both sides in a direction orthogonal to the longitudinal direction of the optical fiber from the base blade portion and the cover blade portion.

5. The coating removal tool according to claim 1,
wherein two pairs of the coating removal blades are provided at predetermined intervals in the front of and rear of the optical fiber in the longitudinal direction, and
wherein the two pairs of coating removal blades are blades for removing the coatings having different outer diameters in the optical fiber.

6. The coating removal tool according to claim 5,
wherein, in the coating removal blades which remove the coating having a larger outer diameter in the two pairs of coating oval blades, arc-shaped recessed parts are formed in a part of a cutting edge of the base blade portion and in a part of a cutting edge of the cover blade portion, respectively.

7. A coating removal tool comprising a base part and a cover part, to remove a coating of an optical fiber by overlapping the cover part and the base part with each other via the optical fiber, in which a glass fiber is covered with the coating, wherein the base part and the cover part are made of resin, and include at least a pair of coating removal blades including a base blade portion provided on the base part and a cover blade portion provided on the cover part, wherein the base part includes a first V-groove which sandwiches the optical fiber in either one or both of a front and rear of the optical fiber in the longitudinal direction with respect to the base blade portion, wherein the cover part includes a second V-groove which sandwiches the optical fiber, and the second V-groove is provided on a side where the first V-groove exists in the front and rear of the longitudinal direction with respect to the cover blade portion in a state where the cover part and the base part are overlapped with each other, wherein a guide portion which regulates a movement direction of an optical fiber holding tool which holds the optical fiber is provided in either one or both of the base part and the cover part, and wherein the guide portion is provided so as to extend in the longitudinal direction of the optical fiber.

8. The coating removal tool according to claim 7, comprising a hinge part that pivotably connects the cover part to the base part,
wherein the cover part, the base part and the hinge part are integrally formed.

9. The coating removal tool according to claim 7,
comprising a positioning portion that is positioned by engaging a protruding portion and a recessed part when the cover part and the base part are overlapped with each other,
wherein the protruding portion is provided on either one of the cover part and the base part, and the recessed part is provided on the other one.

10. The coating removal tool according to claim 7, comprising interval regulating parts that regulate a cutting edge of the base blade portion and a cutting edge of the cover blade portion to a predetermined interval when the cover part and the base part are overlapped with each other,
wherein the interval regulating parts regulate to the predetermined interval by providing portions which are protruding in the direction of an interval between the cutting edge of the base blade portion and the cutting edge of the cover blade portion, in the vicinity of both sides in a direction orthogonal to the longitudinal direction of the optical fiber from the base blade portion and the cover blade portion.

11. The coating removal tool according to claim 7,
wherein two pairs of the coating removal blades are provided at predetermined intervals in the front of and rear of the optical fiber in the longitudinal direction, and
wherein the two pairs of coating removal blades are blades for removing the coatings having different outer diameters in the optical fiber.

12. The coating removal tool according to claim 11,
wherein, in the coating removal blades which remove the coating having a larger outer diameter in the two pairs of coating removal blades, arc-shaped recessed parts are formed in a part of a cutting edge of the base blade portion and in a part of a cutting edge of the cover blade portion, respectively.

13. A coating removal tool comprising a base part and a cover part, to remove a coating of an optical fiber by overlapping the cover part and the base part with each other via the optical fiber, in which a glass fiber is covered with the coating, wherein the base part and the cover part are made of resin, and include at least a pair of coating removal blades including a base blade portion provided on the base part and a cover blade portion provided on the cover part, wherein the base part includes a first V-groove which sandwiches the optical fiber in either one or both of a front and rear of the optical fiber in the longitudinal direction with respect to the base blade portion, wherein the cover part includes a second V-groove which sandwiches the optical fiber, and the second V-groove is provided on a side where the first V-groove exists in the front and rear of the longitudinal direction with respect to the cover blade portion in a state where the cover part and the base part are overlapped with each other, wherein two pairs of the coating removal blades are provided at predetermined intervals in the front of and rear of the optical fiber in the longitudinal direction, wherein the two pairs of coating removal blades are blades for removing the coatings having different outer diameters in the optical fiber, and wherein, in the coating removal blades which remove the coating having a larger outer diameter in the two pairs of coating removal blades, arc-shaped recessed parts are formed in a part of a cutting edge of the base blade portion and in a part of a cutting edge of the cover blade portion, respectively.

14. The coating removal tool according to claim 13, comprising a hinge part that pivotably connects the cover part to the base part, wherein the cover part, the base part and the hinge part are integrally formed.

15. The coating removal tool according to claim 13, comprising a positioning portion that is positioned by engaging a protruding portion and a recessed part when the cover part and the base part are overlapped with each other, wherein the protruding portion is provided on either one of the cover part and the base part, and the recessed part is provided on the other one.

16. The coating removal tool according to claim 13, wherein a guide portion which regulates a movement direction of an optical fiber holding tool which holds the optical fiber is provided in either one or both of the base part and the cover part, and wherein the guide portion is provided so as to extend in the longitudinal direction of the optical fiber.

17. The coating removal tool according to claim 13, comprising interval regulating parts that regulate a cutting edge of the base blade portion and a cutting edge of the cover blade portion to a predetermined interval when the cover part and the base part are overlapped with each other, wherein the interval regulating parts regulate to the predetermined interval by providing portions which are protruding in the direction of an interval between the cutting edge of the base blade portion and the cutting edge of the cover blade portion, in the vicinity of both sides in a direction orthogonal to the longitudinal direction of the optical fiber from the base blade portion and the cover blade portion.

* * * * *